US007894174B2

(12) United States Patent
Moyer et al.

(10) Patent No.: US 7,894,174 B2
(45) Date of Patent: Feb. 22, 2011

(54) METHOD AND APPARATUS FOR FAULT DETECTION SCHEME FOR COLD CATHODE FLUORESCENT LAMP (CCFL) INTEGRATED CIRCUITS

(75) Inventors: James C. Moyer, San Jose, CA (US); Paul Ueunten, San Jose, CA (US)

(73) Assignee: Monolithic Power Systems, Inc., San Jose, CA (US)

( * ) Notice: Subject to any disclaimer, the term of this patent is extended or adjusted under 35 U.S.C. 154(b) by 458 days.

(21) Appl. No.: 12/049,832

(22) Filed: Mar. 17, 2008

(65) Prior Publication Data

US 2008/0158760 A1 Jul. 3, 2008

Related U.S. Application Data

(63) Continuation-in-part of application No. 11/210,542, filed on Aug. 23, 2005, now abandoned.

(60) Provisional application No. 60/603,979, filed on Aug. 23, 2004.

(51) Int. Cl.
*H02H 3/08* (2006.01)

(52) U.S. Cl. ........................................ 361/93.1; 361/18

(58) Field of Classification Search ................... 361/18, 361/93.1; 315/119
See application file for complete search history.

(56) References Cited

U.S. PATENT DOCUMENTS 5,502,819 A 3/1996 Aldrich et al.
5,601,509 A 2/1997 Munoz
5,601,940 A 2/1997 Denecke
5,705,717 A 1/1998 Puy et al.
5,809,233 A 9/1998 Shur
5,902,312 A 5/1999 Frater et al.
5,903,012 A 5/1999 Boerstler
5,929,621 A * 7/1999 Angelici et al. ............. 323/313
6,100,414 A 8/2000 Li et al.
6,109,823 A 8/2000 Halferty et al.
6,109,824 A 8/2000 Annes et al.
6,205,961 B1 3/2001 Bailey et al.
6,300,776 B1 10/2001 Schreiber et al.
6,309,672 B1 10/2001 Bae et al.
6,405,960 B2 6/2002 Yano et al.
6,406,992 B1 6/2002 Mao et al.
6,500,123 B1 12/2002 Holloway et al.
6,500,717 B2 12/2002 Goodwin et al.
6,501,588 B1 12/2002 Rosa et al.
6,503,183 B1 1/2003 Bennish, Jr. et al.
6,505,960 B2 1/2003 Schubert et al.
6,507,034 B1 1/2003 Nakasugi et al.
6,605,426 B1 8/2003 Goldmakher et al.
6,605,727 B2 8/2003 Wood et al.
6,705,676 B1 3/2004 Berringer et al.

(Continued)

*Primary Examiner*—Jared J Fureman
*Assistant Examiner*—Christopher J Clark
(74) *Attorney, Agent, or Firm*—Perkins Coie LLP

(57) ABSTRACT

A fault detection circuit and a short-circuit detection circuit for a Cold Cathode Fluorescent Lamp (CCFL) driver integrated circuit having a power bridge and a CCFL load are disclosed that includes a reference circuit operable to generate a reference current in response to an external component, a replica component having a dimension substantially less than the components of the power bridge, a multiplexer circuit, and a comparator circuit. The replica component and the multiplexer circuit pass the reference current and the replica current to the comparator circuit respectively.

14 Claims, 7 Drawing Sheets

U.S. PATENT DOCUMENTS

| | | | | |
|---|---|---|---|---|
| 6,708,132 | B1 | 3/2004 | Gutierrez et al. | |
| 6,800,993 | B2 | 10/2004 | Tho et al. | |
| 6,805,304 | B1 | 10/2004 | Nokes et al. | |
| 6,805,651 | B2 | 10/2004 | Lipman et al. | |
| 6,806,466 | B2 | 10/2004 | Guevremont et al. | |
| 6,807,033 | B2 | 10/2004 | Zhu | |
| 6,807,332 | B1 | 10/2004 | Hawwa | |
| 6,807,615 | B1 | 10/2004 | Wong et al. | |
| 6,808,833 | B2 | 10/2004 | Johnson | |
| 6,809,769 | B1 | 10/2004 | Yang | |
| 6,900,099 | B2 | 5/2005 | Huang et al. | |
| 6,900,649 | B1 | 5/2005 | Knauer | |
| 6,903,697 | B2 | 6/2005 | Ogino et al. | |
| 6,904,680 | B2 | 6/2005 | Fidziukiewicz | |
| 6,907,995 | B1 | 6/2005 | Tahkanen | |
| 6,909,932 | B2 | 6/2005 | Haschke et al. | |
| 6,979,959 | B2 * | 12/2005 | Henry | 315/291 |
| 7,002,370 | B1 | 2/2006 | Metzgen et al. | |
| 7,005,761 | B2 | 2/2006 | Deboy et al. | |
| 7,006,118 | B2 | 2/2006 | Araki et al. | |
| 7,007,524 | B2 | 3/2006 | Jasper | |
| 7,009,539 | B2 | 3/2006 | Okuda et al. | |
| 7,101,292 | B2 | 9/2006 | Ohama et al. | |
| 7,101,294 | B2 | 9/2006 | Tucker, Sr. | |
| 7,102,003 | B2 | 9/2006 | Gavai et al. | |
| 7,102,628 | B2 | 9/2006 | LeKuch et al. | |
| 7,104,193 | B2 | 9/2006 | Adamczyk et al. | |
| 7,105,788 | B2 | 9/2006 | Hopkins | |
| 7,106,130 | B2 | 9/2006 | Gan et al. | |
| 7,107,338 | B1 | 9/2006 | Nareddy et al. | |
| 7,108,372 | B2 | 9/2006 | Li et al. | |
| 7,108,713 | B1 | 9/2006 | Augustine | |
| 7,108,714 | B1 | 9/2006 | Becker | |
| 7,109,012 | B2 | 9/2006 | Takenawa et al. | |
| 7,200,001 | B2 | 4/2007 | Spychalla | |
| 7,204,214 | B2 | 4/2007 | Miyaji et al. | |
| 7,204,824 | B2 | 4/2007 | Moulis | |
| 7,205,072 | B2 | 4/2007 | Kang et al. | |
| 7,205,073 | B2 | 4/2007 | Kim et al. | |
| 7,205,356 | B2 | 4/2007 | Gurtler et al. | |
| 7,207,985 | B2 | 4/2007 | Duong et al. | |
| 7,378,804 | B2 * | 5/2008 | Mitsuyasu et al. | 315/247 |
| 2002/0171376 | A1 * | 11/2002 | Rust et al. | 315/276 |
| 2002/0180380 | A1 | 12/2002 | Lin | |
| 2005/0030776 | A1 | 2/2005 | Lin | |
| 2005/0151716 | A1 | 7/2005 | Lin | |
| 2005/0174818 | A1 | 8/2005 | Lin et al. | |
| 2006/0202635 | A1 | 9/2006 | Liu | |
| 2006/0232222 | A1 | 10/2006 | Liu et al. | |
| 2006/0279521 | A1 | 12/2006 | Lin | |
| 2007/0047276 | A1 | 3/2007 | Lin et al. | |
| 2007/0085493 | A1 | 4/2007 | Kuo et al. | |

* cited by examiner

METHOD AND APPARATUS FOR FAULT DETECTION SCHEME FOR COLD CATHODE FLUORESCENT LAMP (CCFL) INTEGRATED CIRCUITS

CROSS-REFERENCE TO RELATED APPLICATION

This application is a continuation-in-part of U.S. patent application Ser. No. 11/210,542, filed Aug. 23, 2005, which claims priority to U.S. Provisional Patent Application No. 60/603,979, filed on Aug. 23, 2004, which are both hereby incorporated by reference.

FIELD OF INVENTION

The present invention relates generally to the field of analog integrated circuits. More specifically, the present invention relates to Cold Cathode Florescent Lamp (CCFL) integrated circuits.

BACKGROUND

Cold Cathode Fluorescent Lamp (CCFL) is used to provide backlight to display systems in laptop computers. While most voltages in laptop computers are relatively small in magnitude, the voltage that powers to a CCFL is typically in the order of thousands volts in magnitude. Today, most laptop computers are typically driven by a full bridge power stage that drives a magnetic step-up transformer that provides the required high voltage to the CCFL loads. In this manner, a supply voltage for a laptop computer having a typical voltage of 7 to 22 volts can efficiently regulate a 600 VRMS voltage to the CCFL. However, the high voltage applied to the CCFL may cause dangerous electrocution to users. For this reason, manufacturers are required to implement redundant physical and electrical safety systems to protect consumers from electrocution by their laptop computers.

Additionally, most laptop computers are only commercially viable if they pass standard tests known as the Underwriters Laboratory (U.L.) Standards 1950. In U.L.'s Standards 1950, there are tests designed to determine if products meet health and safety standards. One common test for electrical devices is whether the product would drive too much current through a human body model load. Another common test is whether the product operates safely (or shuts down) when any two physically accessible components are short-circuited—a component short or a short of a component to ground. When such short-circuit conditions happen, U.L.'s Standards require that the laptop to either shut down immediately or limit the operating current to a negligible amount. Thus, it may be desirable to provide a robust fault detection circuit connected to electrical devices, e.g., CCFL loads in laptop computers, which meet the U.L.'s 1950 Standards.

In response, there are many prior-art attempts to pass the U.L.'s 1950 Standards. One of these prior art is shown in FIG. 1 which is an overload sensing circuit 100. Overload sensing circuit 100 includes a transformer 110 electrically coupled to drive a load 120. Load 120 provides a reference voltage at a node A. A first comparator 130 and a second comparator 140 are electrically coupled to load 120 at node A to receive the reference voltage. The other input terminal of first comparator 130 is a band gap voltage; while the other input terminal of second comparator 140 is coupled to receive a band gap voltage divided by 10. When overload sensing circuit 100 operates properly, the output of first comparator 130 and second comparator 140 are typically square waves, which may be difficult to detect improper operation. Furthermore, during fault condition, transformer 110 may saturate. As a result, transformer 110 delivers less current than a specified amount of current to human body model load. When this happens, load 120 does not generate sufficient load current. Thus, comparators 130 cannot accurately report such fault condition.

Referring now to FIG. 2, another prior art current overload sensing circuit 200 is illustrated. In overload sensing circuit 200, instead of using a test of voltage at the output of transformer 110, voltage at the input side (primary winding) may be measured. A first buffer 220 and a second buffer 230 represent the power bridge which drives a transformer 210. A capacitor 240 is coupled in series between second buffer 230 and a terminal B of the primary winding of transformer 210. In addition, a Zener diode 250, a diode 250, a resistor 270, and a common-base transistor 280 are also coupled in series to terminal B. The other side of common-base transistor is a terminal 290. Terminal 290 can be coupled to a comparator (not shown) to determine if the conditions at node B of transformer 210 are reasonable. However, each of the components such as Zener diode 250, diode 260, and common-based transistor 280 are discrete components on a circuit board, which may be shorted or opened in a U.L. test or by a component failure and results in a failure of overload sensing circuit 200. Thus, overload sensing circuit 200 illustrated in FIG. 2 introduces more complexity without providing more robust tests that pass the U.L.'s 1950 Standards.

What may then be useful is a testing scheme which is robust—relatively easy to measure and relatively unlikely to result in failures due the shorting or contact tests within the U.L.'s 1950 Standards.

BRIEF DESCRIPTION OF THE DRAWINGS

The accompanying drawings, which are incorporated in and from a part of this specification, illustrate embodiments of the invention and, together with the description serve to explain the principles of the invention.

DETAILED DESCRIPTION OF THE INVENTION

Reference will now be made in detail to different embodiments of the invention, examples of which are illustrated in the accompanying drawings. While the invention will be described in conjunction with different embodiments, it will be understood that they are not intended to limit the invention to these embodiments. On the contrary, the invention is intended to cover alternatives, modifications and equivalents, which may be included within the spirit and scope of the invention as defined by the appended claims. Furthermore, in the following detailed description of the present invention, numerous specific details are set forth in order to provide a thorough understanding of the present invention. However, it will be obvious to one of ordinary skill in the art that the present invention may be practiced without these specific details. In other instances, well-known methods, procedures, components, and circuits have not been described in detail so as not to unnecessarily obscure aspects of the present invention.

Figure 1:
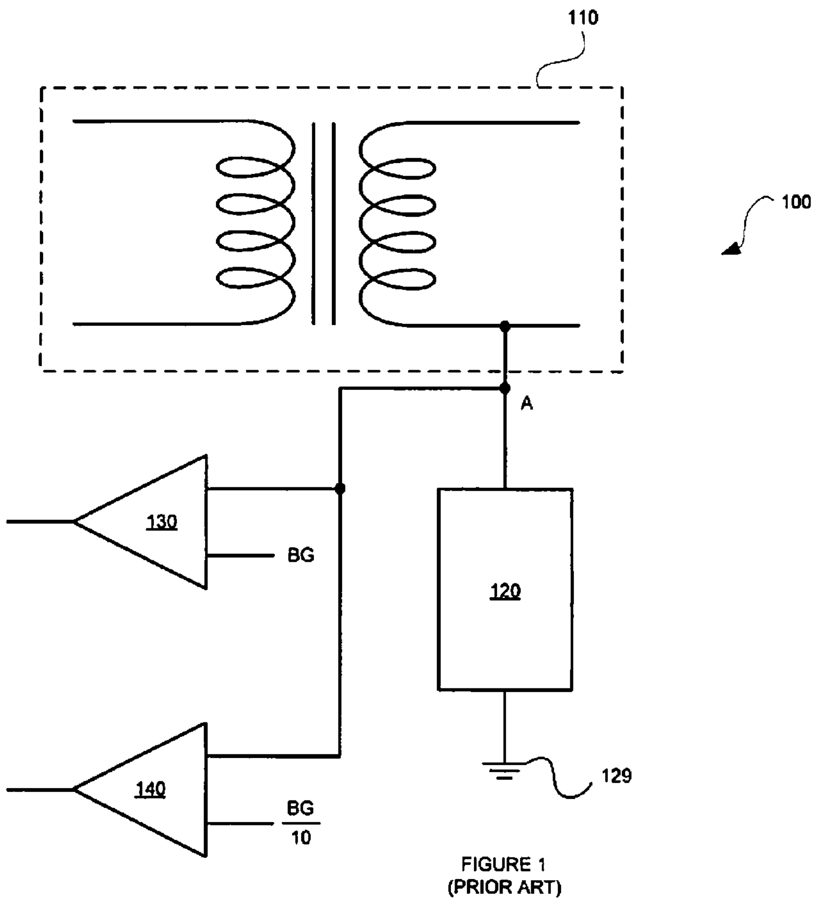
FIGURE 1 (PRIOR ART)
FIG. 1 illustrates a schematic diagram of a prior-art current overload sensing scheme.
Figure 2:
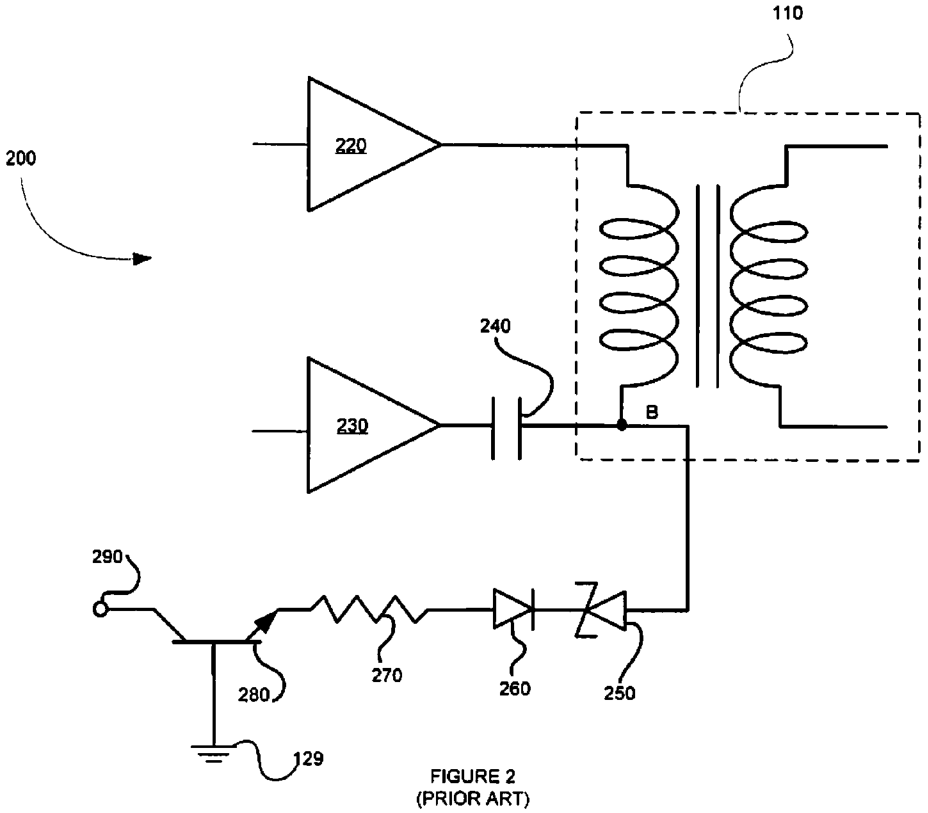
FIGURE 2 (PRIOR ART)
FIG. 2 illustrates a schematic diagram of another prior-art current overload sensing scheme.
Figure 3:
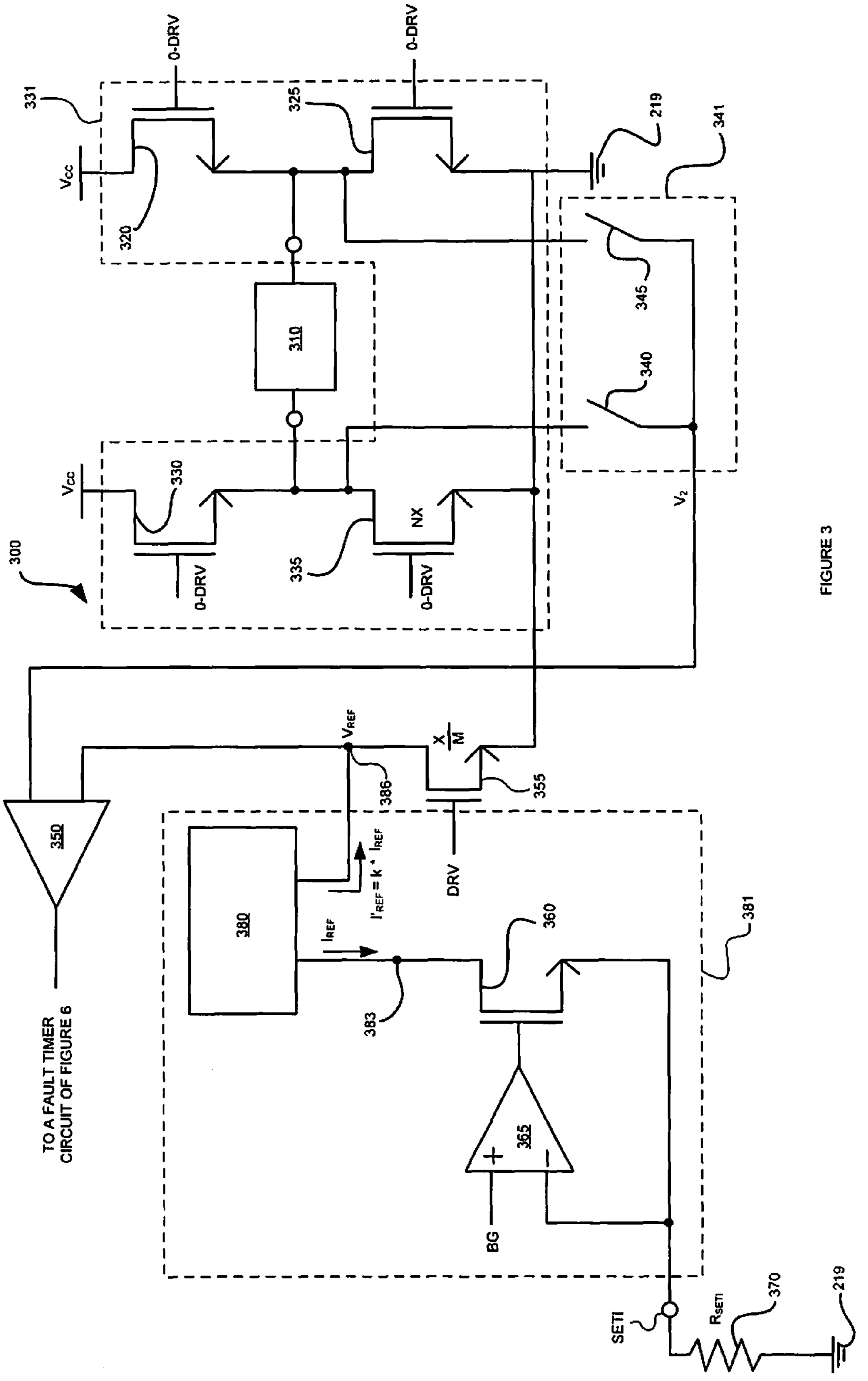
FIG. 3 illustrates a detailed schematic diagram of a fault detection circuit that detects fault conditions that may occur in a Cold Cathode Fluorescent Lamp (CCFL) load in accordance with an embodiment of the present invention.

Turning now to FIG. 3, there is shown an embodiment of a fault detection circuit 300 in accordance with an embodiment of the present invention. In this embodiment, fault detection circuit 300 includes a reference circuit 381, a replica component 355, a multiplexer circuit 341, and a comparator circuit 350, all connected to a power bridge 331 and a load 310. Multiplexer 341 further includes a first switch 340 and a second switch 345.

In one embodiment of the present invention, power bridge 331 is configured by four large power Metal Oxide Semiconductor Field Effect Transistor (MOSFETs) 330, 320, 335, and 325 respectively, each having a dimension of NX. The gates of these power MOSFET 330, 320, 335, and 325 are driven a voltage between 0-DRV volts respectively. The drains of power MOSFET 320 and power MOSFET 330 are connected to a supply voltage VCC The source of power MOSFET 330 is electrically coupled to the drain of power MOSFET 335 and to the first terminal of load 310. Similarly, the source of power MOSFET 320 is electrically coupled to the drain of power MOSFET 325 and to the second terminal of load 310. The sources of power MOSFET 335 and power MOSFET 325 are electrically connected to an electrical ground 219.

Referring again to FIG. 3, power bridge 331 described above is electrically coupled to replica component 355 and to comparator 350. In one embodiment, replica component 355 is a MOSFET that is an exact copy of power MOSFET 330, 320, 335, and 325. However, the size of replica MOSFET 355 is made substantially smaller than that of power MOSFET 335 and power MOSFET 325. More particularly, if the size of power MOSFET 335 and 325 is NX, the dimension of replica MOSFET 355 is X/M, where N and M are integer numbers. In one embodiment, replica MOSFET 355 is about 4,000 times smaller than that of power MOSFET 335. The source of replica MOSFET 355 is electrically coupled to the sources of power MOSFET 355 and power MOSFET 325 and to electrical ground 219, while the gate of replica MOSFET 355 is driven by a voltage DRV. That is, replica MOSFET 355 is always turned on to provide a reference voltage for comparator circuit 350. The drain of replica MOSFET 355 is electrically connected to second input terminal of comparator 350. The first input terminal of comparator 350 is electrically connected to the output of multiplexer 341.

Continuing with FIG. 3, reference circuit 381 includes a current mirror circuit 380, an error amplifier 365, and a pass transistor 360. Current mirror circuit 380 includes a first node 383 and a second node 386. Second node 386 is electrically coupled to the drain of replica MOSFET 355 and to the second input terminal of comparator circuit 350. First node 383 is connected to the drain of pass transistor 360 which is driven by error amplifier 365. The first input terminal of error amplifier 365 is connected to a band gap reference voltage (B.G.). In one embodiment, this band gap reference voltage is about 1.22 volts. The second input terminal of error amplifier 365 is connected to the source of pass transistor 360 and to a pin SETI. An external component 370 is connected between pin SETI and electrical ground 219. In one embodiment, external component is a resistor RSETI whose resistance value is selected at 50 k'Ω.

In operation, when resistor RSETI is selected, a current is set to flow across resistor RSETI. This current is equal to the band gap voltage (B.G.) divided by the resistor RSETI. Any fluctuation of this current will be adjusted by error amplifier 365 that outputs a corrective signal that drives the gate of pass transistor 360. This causes a steady reference current (IREF) to flow on the drain of pass transistor 360 at first node 383. Thus, a mirror current proportional to the current through resistor RSETI flows from second node 386 of current mirror circuit 380 to the drain of replica MOSFET 355. Thus, a voltage reference (VREF) appears at second node 386 and equals to the scaled reference current (I'REF) multiplied by the ON resistance (RDS(ON)) of replica MOSFET 355. Thus, VREF=I'REF×RDS(ON), where I'REF=k*IREF; where IREF=B.G.X RSETI., or IREF=1.22 volts×RSETI.

Continuing with FIG. 3 and the operation of fault detection circuit 300. At multiplexer circuit 341, first switch 340 and second switch 345 are switched out-of-phase so that the voltage at the two terminals of load 310 is a replica voltage (V2) of the voltage drop across power n-MOSFET 325 and power n-MOSFET 335. This replica voltage (V2) is compared to the reference voltage (VREF) at the input terminals of comparator circuit 350. Thus, when load 310 is short-circuited (overcurrent), the replica voltage (V2) will be greater than the reference voltage (VREF). When this fault condition happens, comparator circuit 350 issues a fault signal at its output terminal to a protection circuit that will stop the operation of the entire circuit that contains power bridge 331. Otherwise, when the replica voltage (V2) is less than the reference voltage (VREF), comparator circuit 350 does not issue a fault signal.

Figure 4:
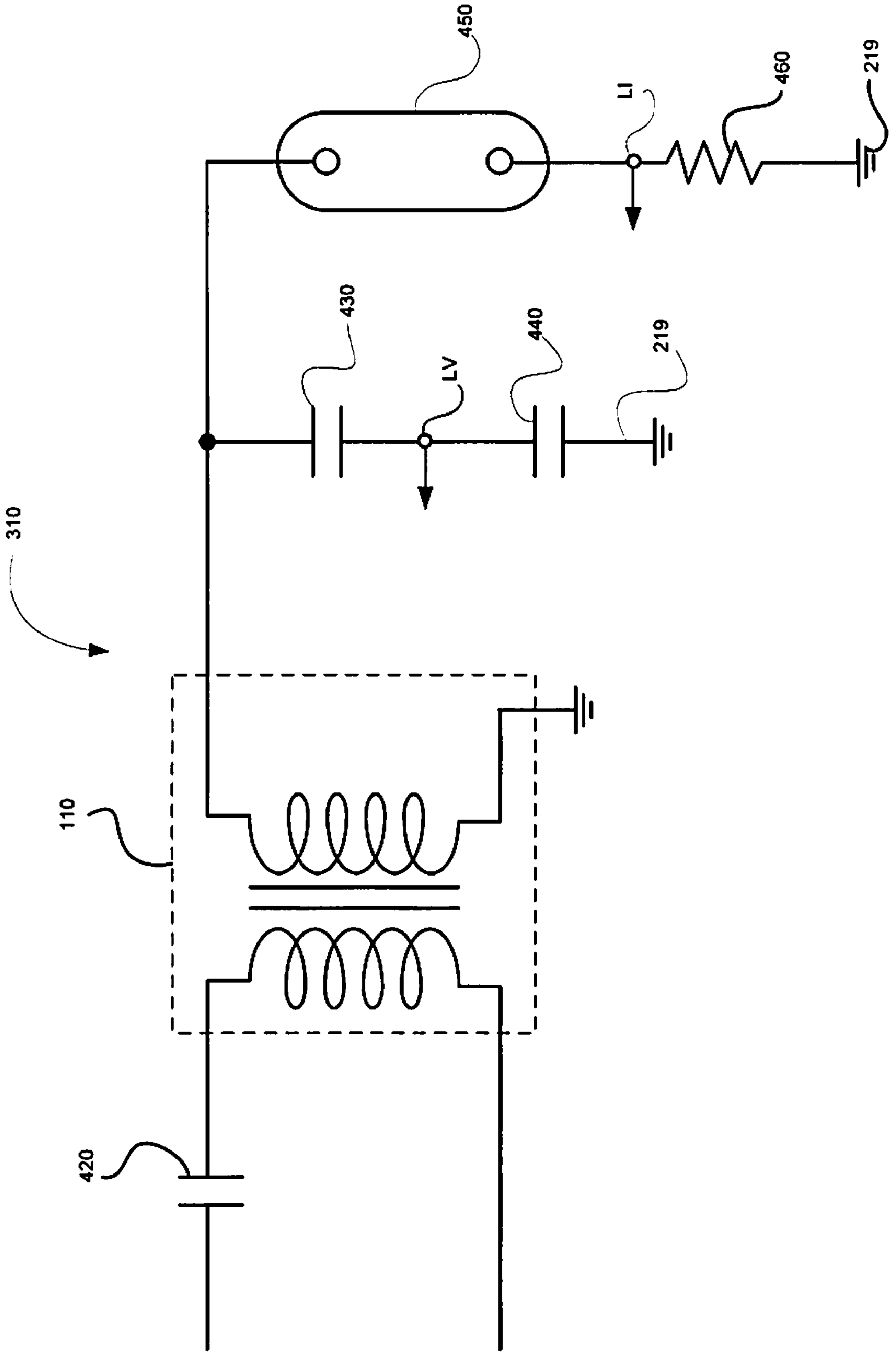
FIG. 4 illustrates a typical CCFL load that includes a lamp voltage feedback (LV) node and a lamp current feedback (LI) node that provide feedback signals to fault protection circuits and initialization circuits in a CCFL driver circuit.

Turning now to FIG. 4, a schematic diagram of load 310 is described which comprises a Cold Cathode Fluorescent Lamp (CCFL) 450. A transformer 110 includes a primary winding and a secondary winding that is connected to one terminal of CCFL 450. The first terminal of primary winding is connected to a capacitor 420. The first terminal of secondary winding of transformer 110 is connected to one terminal of CCFL 450 and a first output capacitor 430 connected in series to a second output capacitor 440 at a node LV where a lamp voltage feedback is provided. The second terminal of CCFL load 450 is connected to an output resistor 460 at a node LI where a lamp current feedback is provided. The lamp voltage feedback (LV) and the lamp current feedback LI provides information about the condition of CCFL 450 during operation so that further fault conditions detection can be achieved. Some of the fault conditions may include Electrostatic Discharge (ESD), over-temperature, over-voltage, under-voltage, etc.

Figure 5:
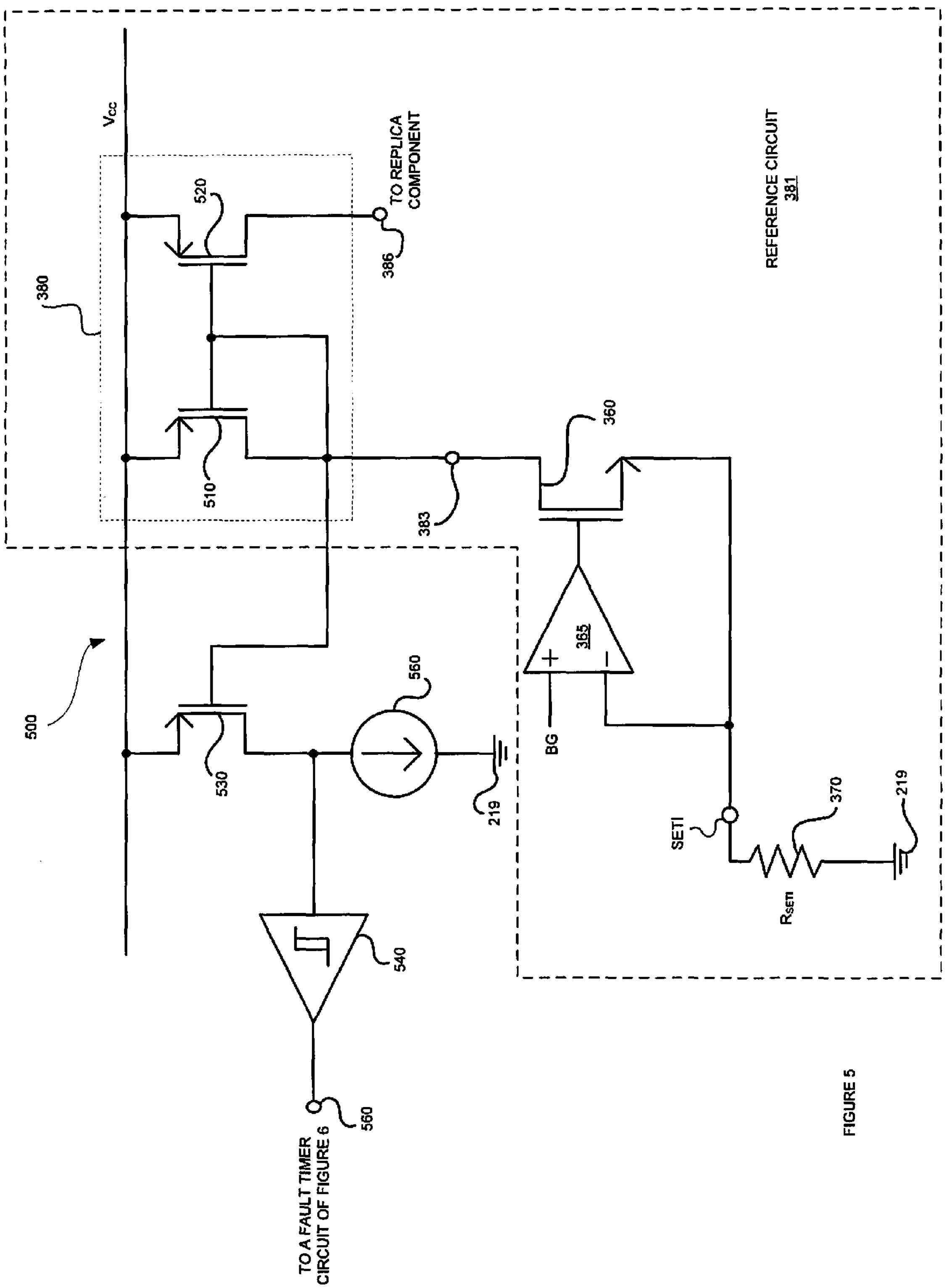
FIG. 5 illustrates a schematic diagram of a short-circuit detection circuit that meets the short circuit test of the Underwriters Laboratory's 1950 Standards in accordance with an embodiment of the present invention.

FIG. 5 illustrates a schematic diagram of a short-circuit detection circuit 500 adapted to meet the requirements of the short-circuit test specified by the U.L.'s 1950 Standards in accordance with an embodiment of the present invention. Short circuit detection circuit 500 includes a p-channel MOSFET 530, a current source 560, and a Schmitt trigger buffer 540 electrically coupled to the reference circuit 381 as shown in FIG. 3. More particularly, the source of p-MOSFET 530 is electrically connected to the source of p-MOSFET 510 and p-MOSFET 520. The gate of p-MOSFET 530 is coupled to first node 383, and its drain is connected to the input of Schmitt trigger buffer 540 and to one terminal of current source 560. The other terminal of current source is connected to electrical ground 219.

In operation, short-circuit detection circuit 500 is used to detect a short at pin SETI. In the Underwriter's Laboratory, testers intentionally short pin SETI to electrical ground 219 and observe whether CCFL load 310 ceases operation. When a short-circuit condition occurs at pin SETI and CCFL load 310 is shut down, U.L.'s Standards are met. When pin SETI is shorted directly to electrical ground 219, either by accident or by a U.L. test, pass transistor 365 causes more current to flow through node 383. As such, p-MOSFET 530 is turned ON, pulling up the input terminal of Schmitt trigger buffer 540. As a result, Schmitt trigger buffer 540 issues a fault signal at node 560 to stop the operation of CCFL load 310. In normal operating conditions, pass transistor 360 conducts only a moderate amount of current. As a result, p-MOSFET transistor 530 is in a high impedance state, current source 560 sinks a current of about 1 μA to electrical ground 219.

Figure 6:
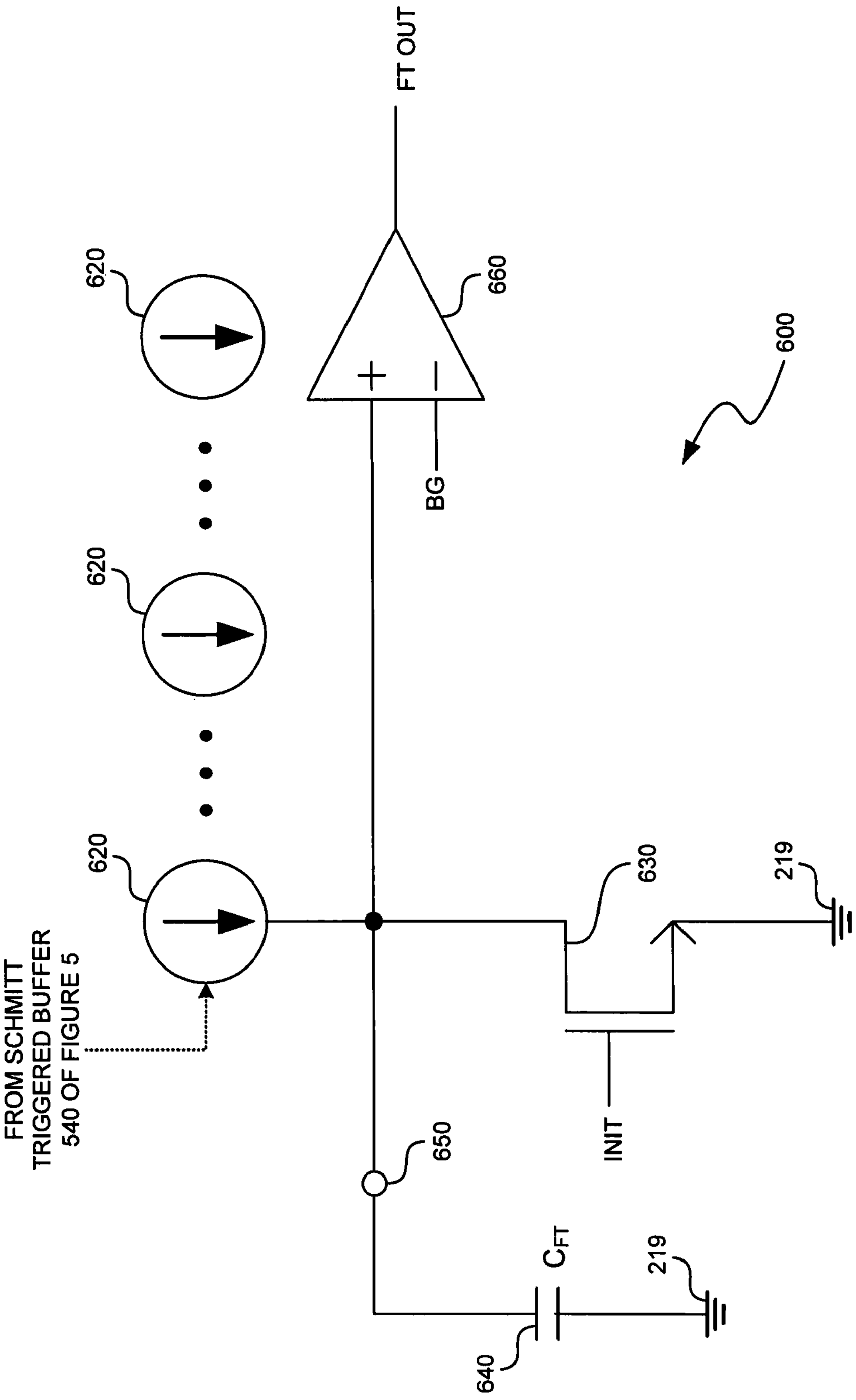
FIG. 6 illustrates a schematic diagram of time-out circuit that sets a fixed amount of timer before shutdown in the occurrence of fault conditions in accordance with an embodiment of the present invention.

Now referring to FIG. 6, a schematic diagram of a fault-timer circuit 600 is described in a subsequent step to complete the protection of CCFL load 310. Fault-timer circuit 600 includes an initialization n-channel MOSFET (n-MOSFET) 630 electrically coupled to a plurality of current sources 620 which represent different timing rates for different fault conditions. An external timing capacitor (CFT) is connected at an input fault pin (FT) 650. Timing capacitor (CFT) 640 is used to set a fixed period of time after a fault condition happens to shut down CCFL load 310. In one embodiment, a plurality of current sources 620 can include a 1 μA open lamp pull-up current source connected to a non-inverting terminal of comparator 660 to electrical ground 219, a 1 μA pull-down no fault current sink, and a 100 μA over-current or short-circuited lamp current source. Input fault pin (FT) 650 is also connected to the non-inverting input terminal of comparator 660. The inverting input terminal of comparator 660 is connected to a band gap voltage (BG). The output terminal of comparator 660 indicates a fault output (FT_OUT). Finally, the source of n-MOSFET 630 is connected to electrical ground 219 and its gate is driven by an initialization voltage (INIT).

Continuing with FIG. 6, in operation, during first initialization, n-MOSFET 630 is turned ON to hold the non-inverting terminal of comparator 660 to electrical ground 219. After awhile, when the initialization process and the power-on is all good, n-MOSFET 630 is turned off. The fault detecting operation begins. When comparator circuit 350 of FIG. 3 sends out a fault signal which enables one of plurality of current sources 620. For example, in an open lamp condition, the 1 μA pull-up open lamp current source is enabled and the 1 μA pull-down current source is disabled, which charges up timing capacitor (CFT) 640. However, under shorted lamp or over-current condition, the 100 μA current source is enabled and charging up timing capacitor (CFT) at a faster rate. Thus, timing capacitor (CFT) 640 provides a time delay before shut-down. Once timing capacitor (CFT) 640 is completely charged up by either current source, comparator circuit 660 compares the voltage at pin 650 with a band gap voltage. In the occurrence of a fault conditions (e.g., under-voltage or over-voltage condition), the voltage at pin 650 is greater than the band gap voltage (B.G.), comparator circuit 660 sends out a fault output signal (FT_OUT) to shut down the operation. Otherwise, under normal operating conditions, the voltage at pin 650 is less than the band gap voltage (B.G.), and the fault output signal (FT_OUT) is not sent out.

Figure 7:
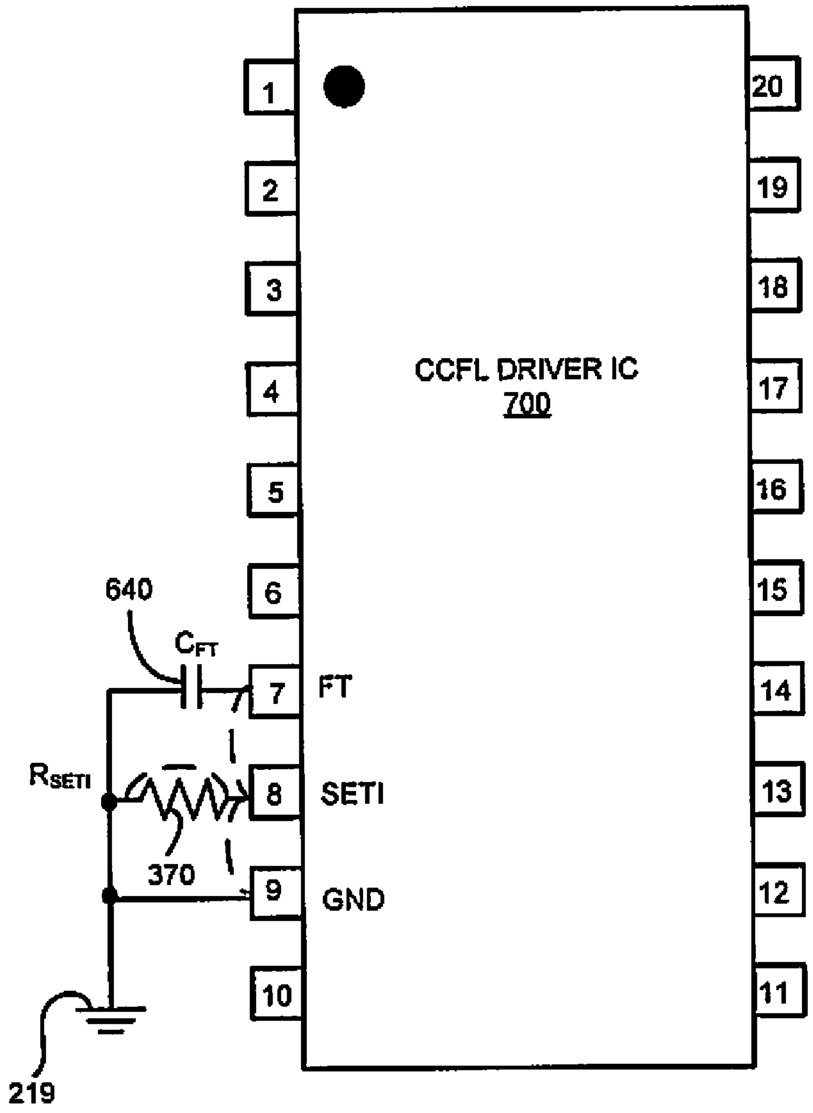
FIG. 7 illustrates a pin-out arrangement of a Cold Cathode Fluorescent Lamp driver integrated circuit that includes the fault timer pin (FT), a current set pin (SETI), and an electrical ground pin (GND) that are used with the fault detection circuit of FIG. 3, the short detection circuit of FIG. 5, and the fault timer circuit of FIG. 6 in accordance with an embodiment of the present invention.

FIG. 7 illustrates a CCFL driver integrated circuit 700 that contains CCFL load 310 and power bridge 331 and its pin arrangement in accordance with an embodiment of the present invention is illustrated. In one embodiment, CCFL driver integrated circuit 700 dedicates pin 7, pin 8, and pin 9 to meet the UL's 1950 Standards for safety requirements. Pin 7 is a fault timer pin (FT) 650 electrically connected to fault timer capacitor (CFT) 640. Pin 8 is dedicated to external current setting component 370 such as RSETI shown in FIG. 3. Pin 9 is a ground pin that is connected to electrical ground 219. The tests in the U.L.'s 1950 Standards require adjacent short and component short tests. More particularly, in an adjacent pin short, pin 7 (FT) is shorted to pin 8 (SETI), and pin 8 (SETI) is then shorted to ground pin (GND). In the component short test, a wire is connected across resistor (SETI) 370 as shown in FIG. 7. When such adjacent short and component short occur, the U.L.s 1950 Standards require fault detection circuit 300, short-circuit protection circuit 500, and fault timer circuit 600 to prevent the operation of CCFL load 310, or CCFL load 310 from starting.

Figure 8:
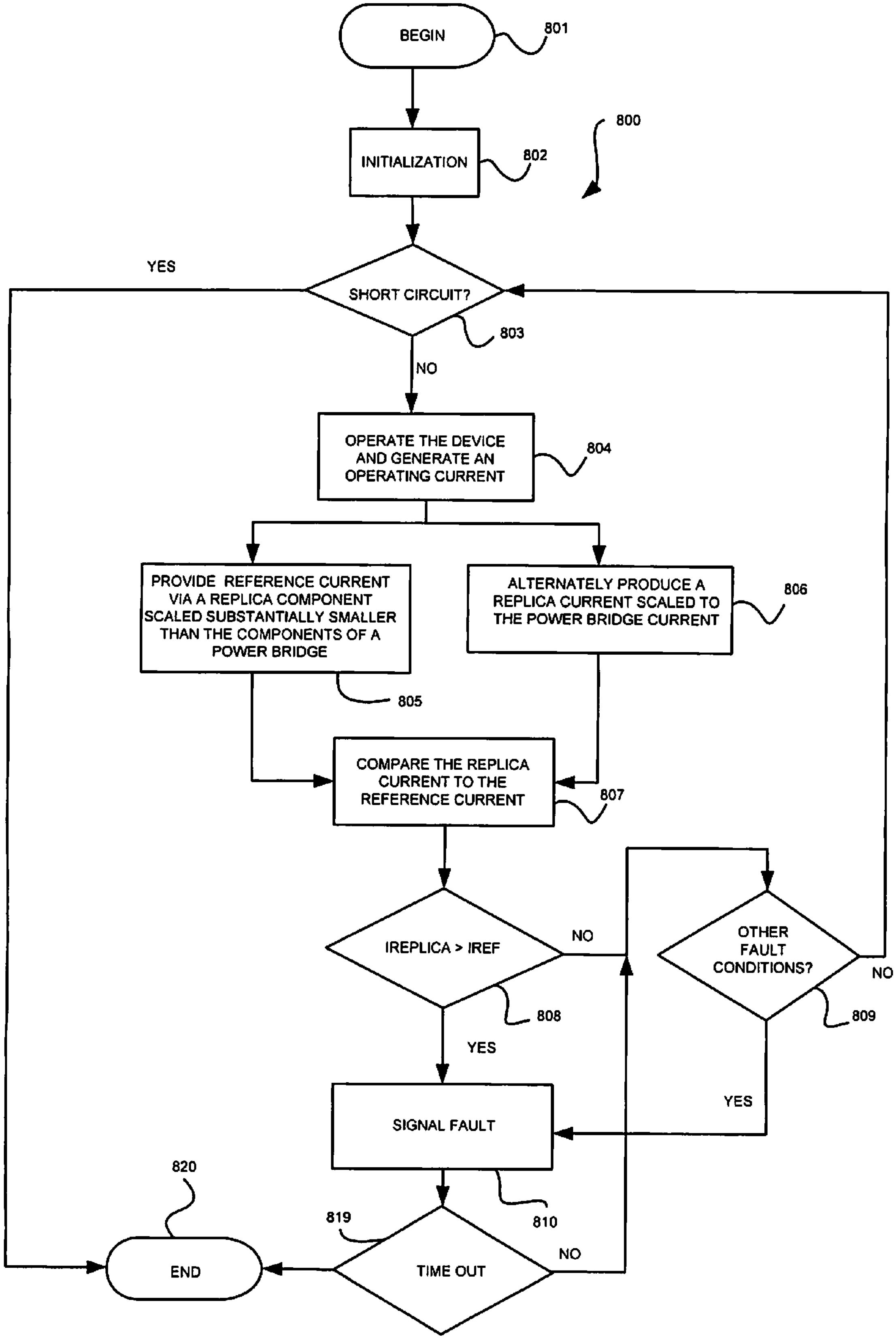
FIG. 8 illustrates a flow chart representing a method of providing fault conditions detection in a CCFL driver integrated circuit in accordance with an embodiment of the present invention.

Now referring to FIG. 8, a flow chart 800 representing a method of providing a fault conditions detection in a Cold Cathode Fluorescent Lamp (CCFL) driver integrated circuit with fault detection capabilities according to an Underwriter Laboratory's Standards is illustrated. Method 800 includes the steps of initializing the CCFL driver integrated circuit, checking for any short-circuit conditions, operating the CCFL load and generating an operating current, providing a reference current that flows through a replica component that is substantially smaller than the components of the power bridge of the CCFL load, producing a replica current proportional to the operating current flowing across the components of the power bridge, comparing these two currents, if the replica current is greater than the reference current, signaling a fault condition, check for time out, and finally checking for any other fault conditions such as over-temperature, Electrostatic Discharge (ESD) conditions Method 800 begins at step 801. In one embodiment, step 801 may include selecting a timing capacitor value (CFT), current resistance value of RSETI, and other external components electrically connected to pins of CCFL driver integrated circuit 700.

Next, referring to step 802, CCFL driver integrated circuit is initialized. Step 802 is implemented by providing an initialization signal (INIT) to the gate of n-MOSFET switch 630 in FIG. 6 to hold down the non-inverting input terminal of comparator circuit 660 to electrical ground 219. After the initialization process has succeeded, the INIT signal is released to open n-MOSFET switch 630.

Referring now to step 803, short-circuit conditions are checked. In one embodiment, step 803 may include checking for short-circuit at fault current setting resistor (RSETI) at pin 8 of CCFL driver integrated circuit 700. As mentioned above, short-circuit conditions include adjacent pin short and component short as shown in FIG. 7. If any of the short-circuit conditions exists, a fault signal is issued at step 819 and the operation ends at step 820. In actuality, step 803 is implemented by short-circuit detection circuit 500 of FIG. 5 of the present invention.

Referring next to step 804, if short-circuit conditions do not exist, a CCFL load connected to a power bridge is operated whereby an operating current is generated. To implement step 810, CCFL driver integrated circuit 700 of the present invention is used that includes power bridge 331 and CCFL load 310.

Now referring to step 805, a reference current is provided by using a replica component substantially smaller than the components of the power bridge. A replica component is connected to the power bridge in such a manner that it provides a scaled reference voltage. In one embodiment, the replica component is substantially smaller than the components of the power bridge. Step 805 is implemented by using a replica MOSFET 355 that is fabricated by the same process but substantially smaller than the power n-MOSFET 335 and power n-MOSFET 325 of power bridge 331. Reference circuit 381 is connected to replica MOSFET 355 so that a scaled reference current can be provided.

Next, referring to step 806, a replica current is extracted from the power bridge. The replica current is proportional to the operating current that flows across the components of the power bridge. In the present invention, step 806 is implemented by connecting the drains of power n-MOSFET 335 and n-MOSFET 325 to multiplexer circuit 341. Since power n-MOSFET 325 and power n-MOSFET 335 are large devices, they have large ON resistance. As a result, the replica current is scaled proportionally to the operating current is provided.

After the currents are sampled, referring now to step 807, the replica current and the reference current are compared. Step 807 is implemented by comparator circuit 350 having a first input terminal connected to multiplexer 341 to receive the replica current and a second input terminal connected to receive the reference current.

Referring next to step 808, determining whether the replica current is larger than the reference current. Step 808 is also implemented by comparator circuit 350.

Referring to step 809, when signal fault and protect the CCFL driver integrated circuit if the replica current is larger than the reference current, other fault conditions in CCFL driver integrated circuit are also checked. These fault conditions may include over-temperature, ESD events, etc. When other fault conditions are found, method 800 goes to step 810 for generating a fault signal and then to step 819 to check for time-out condition. Next, if there is no time out, step 820 is performed to end the operation. On the other hand, if a timer-out is set by external timing capacitor (CFT), wait for a fixed amount of time and then stops the operation in step 820. When other fault conditions do not occur, step 809 returns to step 803 to check for short-circuit conditions again.

Finally, when the replica current is less than the reference current, method 800 continues to operate CCFL driver integrated circuit at step 804.

Obviously many modifications and variations of the present invention are possible in light of the above teachings. It is therefore to be understood that within the scope of the appended claims the invention may be practiced otherwise than as specifically described. It should be understood, of course, the foregoing disclosure relates only to a preferred embodiment (or embodiments) of the invention and that numerous modifications may be made therein without departing from the spirit and the scope of the invention as set forth in the appended claims. Various modifications are contemplated and they obviously will be resorted to by those skilled in the art without departing from the spirit and the scope of the invention as hereinafter defined by the appended claims as only a preferred embodiment(s) thereof has been disclosed.

What is claimed is:

1. A fault detection circuit for a Cold Cathode Fluorescent Lamp (CCFL) driver integrated circuit having a power bridge and a CCFL load, comprising:

- a reference circuit operable to generate a reference current in response to an external component coupled thereto, wherein said reference circuit comprises:
  - a pass transistor electrically coupled to a band gap reference voltage;
  - an error amplifier electrically coupled to the gate of said pass transistor;
  - a current mirror circuit electrically coupled to the drain of said pass transistor and to a replica component; and
  - a short-circuit detection circuit for detecting a short-circuit condition in said external component;
- the replica component, electrically and thermally coupled to said reference circuit, said replica component having a dimension substantially less than components of said power bridge and operable to pass said reference current; and
- a comparator circuit electrically coupled to said reference circuit and said replica component.

2. The fault detection circuit of claim 1 further comprising a multiplexer circuit, electrically coupled to said power bridge and to said comparator circuit, operable to pass a replica current proportional to an operating current that drives said CCFL load.

3. The fault detection circuit of claim 2 wherein said multiplexer circuit further comprises:

- a first switch;
- a second switch electrically coupled to said first switch, said first switch and said second switch being switched out-of-phase to provide said replica current.

4. The fault detection circuit of claim 1 wherein said short circuit detection circuit further comprises:

- a third p-channel Metal Oxide Semiconductor Field Effect Transistor (p-MOSFET) electrically coupled to said current mirror circuit;
- a current source electrically coupled to said third p-MOSFET; and
- a Schmitt trigger buffer electrically coupled to said current source and said third p-MOSFET transistor.

5. The fault detection circuit of claim 1 wherein said power bridge comprises a plurality of matched power n-channel Metal Oxide Semiconductor Field Effect Transistors (n-MOSFET).

6. The fault detection circuit of claim 5 wherein said replica component comprises a n-channel Metal Oxide Semiconductor Field Effect Transistor (n-MOSFET).

7. The fault detection circuit of claim 1 wherein said CCFL load further comprises:

- a power transformer having a primary winding and a secondary winding;
- a capacitor electrically coupled in series with the first terminal of the primary winding of said power transformer; and
- a Cold Cathode Fluorescent Lamp (CCFL) electrically coupled to the first terminal of the secondary winding of said power transformer.

8. The fault detection circuit of claim 7 wherein said CCFL load further comprises:

- a first capacitor electrically coupled to the first terminal of the secondary winding at the first terminal; and
- a second capacitor electrically coupled to the second terminal of said first capacitor for providing a voltage feedback to said CCFL driver integrated circuit.

9. The fault detection circuit of claim 7 wherein said CCFL load further comprises a resistor electrically coupled to a terminal of said CCFL to provide a lamp current feedback to said CCFL driver integrated circuit.

10. The apparatus of claim 9 wherein said current mirror circuit further comprises:

a first p-channel Metal Oxide Semiconductor Field Effect Transistor (p-MOSFET); and a second p-channel Metal Oxide Semiconductor Field Effect Transistor (p-MOSFET) electrically coupled to said first p-MOSFET.

11. A fault detection circuit for a Cold Cathode Fluorescent Lamp (CCFL) driver integrated circuit having a power bridge and a CCFL load, comprising:

a reference circuit operable to generate a reference current in response to an external component coupled thereto;

a replica component, electrically and thermally coupled to said reference circuit, said replica component having a dimension substantially less than components of said power bridge and operable to pass said reference current, a comparator circuit electrically coupled to said reference circuit and said replica component; and a fault timer circuit electrically coupled to said CCFL driver integrated circuit, operable to set a fixed timer period after which to trigger a shutdown after fault conditions occur in said CCFL driver integrated circuit, wherein said fault timer circuit further comprises:

a plurality of a current sources;

a n-channel Metal Oxide Semiconductor Field Effect Transistor (n-MOSFET) switch electrically coupled to said current sources, said n-MOSFET switch only turned off when said CCFL driver integrated circuit is ready, otherwise, said n-MOSFET switch is turned ON during an initialization process; and a comparator circuit electrically coupled to said plurality of current sources, said n-MOSFET switch, and to a band gap reference voltage.

12. A Cold Cathode Fluorescent Lamp (CCFL) driver integrated circuit, comprising:

a first n-channel power Metal Oxide Field Effect Transistor (n-MOSFET) transistor;

a second power n-MOSFET transistor;

a third power n-MOSFET transistor electrically coupled in series to said first power transistor and to the first terminal of a Cold Cathode Fluorescent Lamp (CCFL) load;

a fourth power n-MOSFET transistor electrically coupled in series to said second power transistor and to the second terminal of said CCFL load;

a replica n-MOSFET transistor formed substantially smaller than said third and said fourth power n-MOSFET transistors, said replica n-MOSFET transistor electrically and thermally coupled to match said third and said fourth power n-MOSFET transistors; and a comparator circuit having a first input and a second input, electrically coupled to said replica n-MOSFET transistor, said third power n-MOSFET transistor, and to said fourth power n-MOSFET transistor, and further comprises a reference circuit that further comprises:

a first p-channel Metal Oxide Semiconductor (pMOS);

a second p-channel Metal Oxide Semiconductor (pMOS) electrically coupled to said first pMOS transistor to form a current mirror circuit;

a pass n-channel Metal Oxide Semiconductor Field Effect Transistor (n-MOSFET) electrically coupled to said current mirror, and to an external component;

an operational amplifier, electrically coupled to receive a band gap reference voltage, the output terminal of said operational amplifier electrically coupled to drive the gate of said pass n-MOSFET, a short circuit detection circuit which further comprises:

a fifth p-channel Metal Oxide Semiconductor (pMOS) transistor electrically coupled to said current mirror circuit;

a current source electrically coupled to said fifth p-MOSFET; and a Schmitt trigger buffer electrically coupled to said current source and said fifth p-MOSFET transistor.

13. A Cold Cathode Fluorescent Lamp (CCFL) driver integrated circuit, comprising:

a first n-channel power Metal Oxide Field Effect Transistor (n-MOSFET) transistor:

a second power n-MOSFET transistor:

a third power n-MOSFET transistor electrically coupled in series to said first power transistor and to the first terminal of a Cold Cathode Fluorescent Lamp (CCFL) load:

a fourth power n-MOSFET transistor electrically coupled in series to said second power transistor and to the second terminal of said CCFL load:

a replica n-MOSFET transistor formed substantially smaller than said third and said fourth power n-MOSFET transistors, said replica n-MOSFET transistor electrically and thermally coupled to match said third and said fourth power n-MOSFET transistors; and a comparator circuit having a first input and a second input, electrically coupled to said replica n-MOSFET transistor, said third power n-MOSFET transistor; and to said fourth power n-MOSFET transistor, a fault timer circuit that comprises:

a plurality of a current sources;

a n-channel Metal Oxide Semiconductor Field Effect Transistor (n-MOSFET) switch electrically coupled to said current sources, said n-MOSFET switch only turned off when said CCFL driver integrated circuit is ready, otherwise, said n-MOSFET switch is turned ON during an initialization process.

14. The CCFL driver integrated circuit of claim 13 further comprising:

a multiplexer electrically coupled to said third power n-MOSFET transistor and to said fourth power n-MOSFET transistor.

* * * * *